United States Patent
Gunnels et al.

(10) Patent No.: US 8,037,215 B2
(45) Date of Patent: Oct. 11, 2011

(54) PERFORMANCE EVALUATION OF ALGORITHMIC TASKS AND DYNAMIC PARAMETERIZATION ON MULTI-CORE PROCESSING SYSTEMS

(75) Inventors: John A. Gunnels, Yorktown Heights, NY (US); Shakti Kapoor, Austin, TX (US); Ravi Kothari, New Delhi (IN); Yogish Sabharwal, New Delhi (IN); James C. Sexton, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 803 days.

(21) Appl. No.: 12/130,167

(22) Filed: May 30, 2008

(65) Prior Publication Data
US 2009/0144738 A1    Jun. 4, 2009

Related U.S. Application Data

(63) Continuation of application No. 11/947,185, filed on Nov. 29, 2007, now abandoned.

(51) Int. Cl.
G06F 13/28     (2006.01)
G06F 17/50     (2006.01)

(52) U.S. Cl. ................ 710/22; 710/23; 710/24; 710/25; 710/26; 710/27; 710/28; 703/13

(58) Field of Classification Search ........................ None
See application file for complete search history.

(56) References Cited

U.S. PATENT DOCUMENTS

| | | |
|---|---|---|
| 4,067,059 A | 1/1978 | Derchak |
| 4,458,313 A | 7/1984 | Suzuki et al. |
| 6,473,780 B1 | 10/2002 | Barcelo |
| 6,854,025 B2 | 2/2005 | Knight et al. |
| 6,898,657 B2 * | 5/2005 | Smith ........................ 710/305 |

OTHER PUBLICATIONS

R.C. Whaley et al., "Automated Empirical Optimization of Software and the ATLAS Project," 2000, pp. 1-33, http://www.netlib.org/lapack/lawnspdf/lawn147.pdf.
M. Frigo et al., "The Design and Implementation of FFTW3," Proceedings of the IEEE, 2005, pp. 1-16, vol. 93, No. 2.
K. Yotov et al., "X-Ray: A Tool for Automatic Measurement of Hardware Parameters", QEST'05: Proceedings of the Second International Conference on the Quantitative Evaluation of Systems, 2005, 10 pages.

* cited by examiner

*Primary Examiner* — Alan Chen
(74) *Attorney, Agent, or Firm* — Derek S. Jennings; Ryan, Mason & Lewis, LLP

(57) ABSTRACT

Apparatus for evaluating the performance of DMA-based algorithmic tasks on a target multi-core processing system includes a memory and at least one processor coupled to the memory. The processor is operative: to input a template for a specified task, the template including DMA-related parameters specifying DMA operations and computational operations to be performed; to evaluate performance for the specified task by running a benchmark on the target multi-core processing system, the benchmark being operative to generate data access patterns using DMA operations and invoking prescribed computation routines as specified by the input template; and to provide results of the benchmark indicative of a measure of performance of the specified task corresponding to the target multi-core processing system.

4 Claims, 2 Drawing Sheets

PERFORMANCE EVALUATION OF ALGORITHMIC TASKS AND DYNAMIC PARAMETERIZATION ON MULTI-CORE PROCESSING SYSTEMS

CROSS-REFERENCE TO RELATED APPLICATION(S)

This application is a continuation of pending U.S. application Ser. No. 11/947,185 filed on Nov. 29, 2007, the disclosure of which is incorporated herein by reference. The present application is also related to a commonly assigned U.S. application Ser. No. 11/947,156 filed on Nov. 29, 2007, the disclosure of which is incorporated by reference herein in its entirety.

FIELD OF THE INVENTION

The present invention relates to the electrical, electronic, and computer arts, and, more particularly, to evaluating the performance of algorithmic tasks.

BACKGROUND OF THE INVENTION

A multi-core computing system typically includes some combination of shared memory units, accessible by all cores, and/or local memory units, associated with individual cores. Most of the cores, although not necessarily all, access these memory units using direct memory access (DMA). Access to local memory units may be direct and/or some cores may have direct access to the shared memory units. Further, there may be a different path between the unshared memory units (e.g., hand-carried coherence).

In high-performance computing (HPC) applications, particularly mathematical libraries such as those involving, for example, linear algebra and Fast Fourier Transforms (FFTs), automatic code generation techniques have been widely used. Such code generation techniques typically utilize code generators which search a large parameter space to determine the set of parameters (e.g., how much to loop unroll by, block sizes/sub-problem sizes to use, etc.) which provides optimal performance for a given underlying platform.

One known optimization technique to reduce the parameter space searched by the code generator is to first determine the hardware parameters of the underlying architecture and then limit the search parameters based on these underlying hardware parameters. As a specific example, once the cache size of a given platform is known, a matrix transpose code can limit the space of block sizes to transpose so that the loaded block resides in the cache. Unfortunately, however, these conventional techniques work offline and generate optimal code for fixed configurations (Fast Fourier Transform in the West (FFTW), a C subroutine library, may work dynamically at run-time, but that is only useful if the plan (i.e., outcome) is to be reused multiple times; otherwise it is more beneficial to store and reuse the plan rather than run it every time). Moreover, these techniques do not take into account optimizations possible with regards to DMA operations (e.g., they do not search the DMA parameter space).

DMA operations can have significant impact on the performance of applications. Some of the issues involved include the following:

DMA operations tend to have high latencies, discouraging working iteratively on small blocks/vectors.

Performance of DMA lists is often not as good as that of contiguous DMA. Therefore in certain cases, it is beneficial to perform contiguous DMA operations, even if that means fetching unwanted data.

Performance of DMA lists often degrades with decreasing size of each list operation which discourages working on small blocks.

Interactions between DMA requests originating from different processing cores often has a degrading effect on the performance of the system (both locally and globally).

In single-ported local memory units, the DMA operations can undesirably interfere with the computation, thereby impacting the performance of the algorithmic task(s) being performed (for instance, the core could starve for instructions if DMA is given higher priority than the local memory unit).

Accordingly, there exists a need for techniques for evaluating the performance of algorithmic tasks that use DMA for data transfer that do not suffer from one or more of the limitations exhibited by conventional approaches.

SUMMARY OF THE INVENTION

An illustrative embodiment of the present invention meets the above-noted need by providing techniques for more efficiently evaluating the performance of algorithmic tasks on a target multi-core processing system. Results of a benchmark indicative of a measure of performance of a template characterizing an algorithmic task to be evaluated on a target multi-core processing system can be collected and stored. The stored performance results can be used to dynamically determine optimal performance parameters with which to schedule a task at run-time.

In accordance with one aspect of the invention, a method for evaluating performance of direct memory access (DMA)-based algorithmic tasks on a target multi-core processing system is provided. The method includes the steps of: inputting a template for a specified task, the template including DMA-related parameters specifying DMA operations and computational operations to be performed; evaluating performance for the specified task by running a benchmark on the target multi-core processing system, the benchmark being operative to generate data access patterns using DMA operations and invoking prescribed computation routines as specified by the input template; and providing results of the benchmark indicative of a measure of performance of the specified task corresponding to the target multi-core processing system. The method for evaluating the performance of DMA-based algorithmic tasks may be embodied in a computer program product.

In accordance with another aspect of the invention, a method for dynamically determining optimal performance parameters with which to schedule tasks at run-time on a target multi-core processing system is provided. The method includes the steps of: creating a performance model offline using, as input, performance data corresponding to a task, the performance model representing an evaluation of performance of DMA-based algorithmic tasks on the target multi-core processing system; retrieving a task to be scheduled; determining optimal performance parameters with which to schedule the task based at least in part on the performance model; and scheduling the task using the optimal performance parameters. The steps of retrieving the task, determining the optimal performance parameters and scheduling the task are performed on the target multi-core processing system. The method for dynamically determining optimal performance parameters with which to schedule tasks at run-time on a target multi-core processing system may be embodied in a computer program product.

In accordance with yet another embodiment of the invention, apparatus for evaluating performance of DMA-based algorithmic tasks on a target multi-core processing system includes a memory and at least one processor coupled to the memory. The processor is operative: to input a template for a specified task, the template including DMA-related parameters specifying DMA operations and computational operations to be performed; to evaluate performance for the specified task by running a benchmark on the target multi-core processing system, the benchmark being operative to generate data access patterns using DMA operations and invoking prescribed computation routines as specified by the template; and to provide results of the benchmark indicative of a measure of performance of the specified task corresponding to the target multi-core processing system.

In accordance with still another embodiment of the invention, apparatus for dynamically determining optimal performance parameters with which to schedule tasks at run-time on a target multi-core processing system includes a memory and at least one processor coupled to the memory. The processor is operative: to create a performance model offline using, as input, performance data corresponding to a task, the performance model representing an evaluation of performance of DMA-based algorithmic tasks on the target multi-core processing system; to retrieve a task to be scheduled; to determine optimal performance parameters with which to schedule the task based at least in part on the performance model; and to schedule the task using the optimal performance parameters. Retrieving the task, determining the optimal performance parameters and scheduling the task are performed on the target multi-core processing system.

These and other features, aspects, and advantages of the present invention will become apparent from the following detailed description of illustrative embodiments thereof, which is to be read in connection with the accompanying drawings.

DETAILED DESCRIPTION OF THE INVENTION

One or more embodiments of the present invention provide a means for evaluating the performance of algorithmic-tasks that use DMA for data transfers on a multi-core processing system. Furthermore, aspects of the invention can be used for dynamically determining optimal performance parameters for a scheduled task at run-time based at least in part on results of the performance evaluation, as will become apparent to those skilled in the art given the teachings of the invention provided herein, although the invention is not limited to such an application. While certain aspects of the invention are described herein in the context of illustrative program code implementations, it should be understood that the present invention is not limited to the specific implementations shown.

Figure 1:
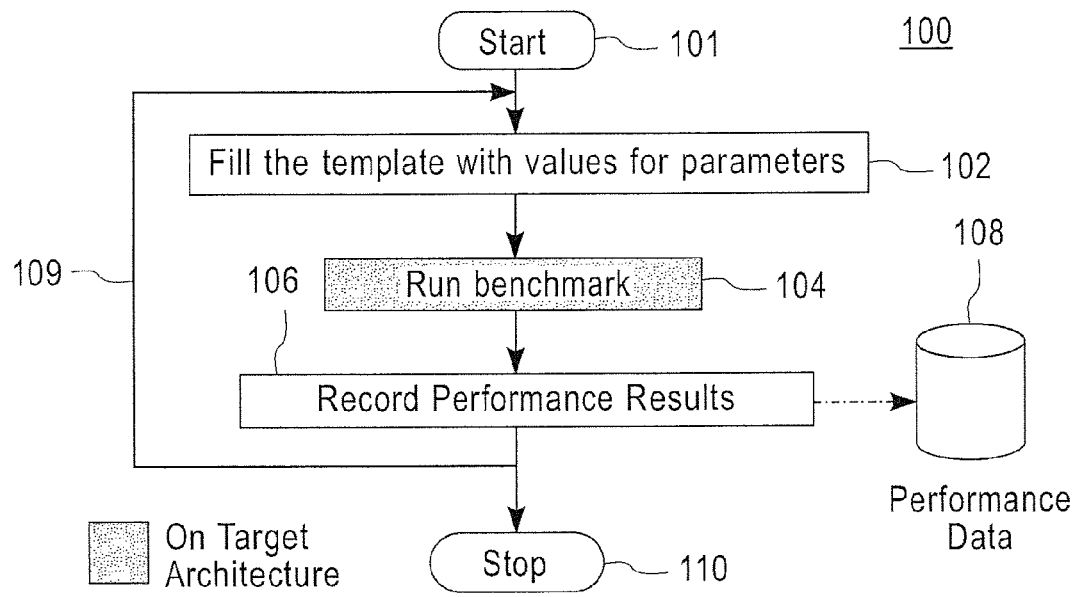
FIG. 1 illustrates a flow chart of exemplary method steps for at least a portion of an exemplary method for evaluating the performance of algorithmic-tasks that use DMA for data transfers on a multi-core processing system, in accordance with one embodiment of the invention.

With reference to FIG. 1, a flow chart 100 of exemplary method steps is shown for at least a portion of an exemplary method for evaluating the performance of algorithmic-tasks that use DMA for data transfers on a multi-core processing system, in accordance with one embodiment of the invention. After starting at block 101, a template is generated in block 102 including one or more parameters characterizing an algorithmic task to be evaluated. In block 104, a benchmark is run on a target architecture using the template as an input. The benchmark is operative to generate an output which is indicative of some measure of performance of the specified input template on the target architecture. In block 106, a record of performance results is created as a function of the output of the benchmark. This record of performance results may be optionally stored, for example in a database 108 or alternative storage element. The method may then be repeated by proceeding again to block 102, via branch 109, where a new template is generated based on a new set of parameters characterizing the algorithmic task to be evaluated in a next iteration. The invention is not limited to any particular number of iterations to be performed during a given performance evaluation methodology. When no further parameters are to be evaluated, the method stops at block 110. It is to be understood that the respective methodologies performed by blocks 102 and 106 need not be executed on the target architecture. These blocks will be described in further detail herein below.

An algorithmic task can be specified to the benchmark in the form of a template. The template is preferably a set of parameters that define and characterize the underlying computation and DMA operations to be performed by one or more processing cores in the processing system. Once a template is created for a given task, its performance within a search space can be determined by varying the parameters in the template. The template defining parameters should be extensive enough to cover a number of important DMA-based scenarios, including, for example: contiguous and list-based DMA operations; contiguous and strided access of vectors using DMA; different access patterns for traversing matrices (e.g., row-wise, column-wise) using DMA; computations overlapped with DMA operations; and double buffering/triple buffering techniques using DMA.

A template is essentially a list of DMA and computation work-items that can be executed by the processing cores. The template may specify, for example, what work-items are to be performed, in what order, how often, etc. The template also captures dependencies between these work-items. More particularly, a template may be defined by one or more of the following: number of processing cores to use; number of iterations of the task to be performed, which is primarily useful in obtaining accurate timing information; and a list of work-items.

A work-item, in accordance with one embodiment of the invention, can be categorized into one of three types: DMA operation; DMA wait operation; and compute operation. Exemplary parameters corresponding to each of these types of work-items are described in further detail below. It is to be appreciated that the invention is not limited to the number and/or type of categories to which work-items are assigned.

DMA Operation

A DMA operation work-item can be defined by one or more of the following exemplary parameters:

| | |
|---|---|
| Operation: | Identifies a type of DMA operation to be performed. Illustrative types of DMA operations include, for example, Get, Put, Get List or Put List, although the invention is not limited to these specific DMA operations. |
| Unique work-item identifier: | Uniquely identifies one work-item from another work-item. |
| Start-Addr: | Represents a starting global address of a remote/shared memory unit. |
| Local-Addr: | Represents a starting local address of a local memory unit. |
| Num-O-Iters: | Represents a number of outer-block iterations to be performed. |
| Num-M-Iters: | Represents a number of middle-block iterations to be performed. |
| Num-I-Iters: | Represents a number of inner-block iterations to be performed. |
| O-JumpSize: | Represents a jump size by which to increment address for performing outer-loop iterations. |
| M-JumpSize: | Represents a jump size by which to increment the address for performing middle-loop iterations. |
| I-JumpSize: | Represents a jump size by which to increment the address for performing inner-loop iterations. |
| List Size: | Represents a number of list entries in a DMA list. |
| DMA Size: | Represents a DMA size of a list entry in a DMA list. |
| List-JumpSize: | Represents a size by which to increment the address between list entries in a DMA list. |
| Operation frequency: | Indicates how often the DMA operation work-item is to be performed. |
| Operation frequency initial offset: | Indicates when the DMA operation work-item is to be performed first. |

It is to be understood that the parameters described above are merely illustrative, and that the invention is not limited to any specific number and/or type of parameters assigned to a given DMA operation work-item.

DMA Wait Operation

A DMA Wait operation work-item is preferably used to wait for completion of a specified DMA operation. The DMA Wait operation work-item can be defined by one or more of the following exemplary parameters:

| | |
|---|---|
| Operation: | DMA Wait |
| Work-item identifier: | Identifies the DMA operation work-item to wait for. |
| Num Executions: | Represents the number of times to perform the DMA Wait operation. |
| Operation frequency: | Indicates how often the DMA Wait operation work-item is to be performed. |
| Operation frequency initial offset: | Indicates when the DMA Wait operation work-item is to be performed first. |

It is to be understood that the parameters described above are merely illustrative, and that the invention is not limited to any specific number and/or type of parameters assigned to a given DMA Wait operation work-item.

Compute Operation

A Compute operation work-item is preferably used to schedule user-specified computation. The Compute operation work-item can be defined by one or more of the following exemplary parameters:

| | |
|---|---|
| Operation: | Compute |
| Kernel Index: | Identifies an index of a computational kernel to be executed from among a list of kernels provided by the user. |
| Parameters: | Represents a list of parameters passed to the computational kernel. |
| Num Executions: | Represents the number of times to perform the Compute operation work-item. |
| Operation frequency: | Represents how often the Compute operation work-item is to be performed. |
| Operation frequency initial offset: | Represents when the Compute operation work-item is to be performed first. |

It is to be understood that the parameters described above are merely illustrative, and that the invention is not limited to any specific number and/or type of parameters assigned to a given Compute operation work-item.

The combination of the above parameters allows for different access patterns to be generated for traversing and operating on blocks in matrices and vectors. By way of example, the Basic Linear Algebra Subprograms (BLAS) library is widely utilized in many supercomputing applications, and is used to implement more extensive linear algebra subroutine libraries, such as, for example, LINPACK (which is a collection of Fortran subroutines that analyze and solve linear equations and linear least-squares problems) and LAPACK (a linear algebra package which has largely superseded LINPACK and is designed to run efficiently on shared-memory, vector supercomputers). Level-1 BLAS, which involves vector-vector operations, essentially relied upon using assembly-coded routines to get the most efficiency from machines. To achieve more efficient utilization of caches and parallelism, it was recognized that the algorithms had to be moved to "higher," more complex operations. BLAS level-2 subprograms involve matrix-vector operations, while BLAS level-3 subprograms involve matrix-matrix operations. BLAS level-3 subprograms, such as, for example, operations involving matrix multiplication, are characterized by possessing loop nests of depth three.

Figure 2:
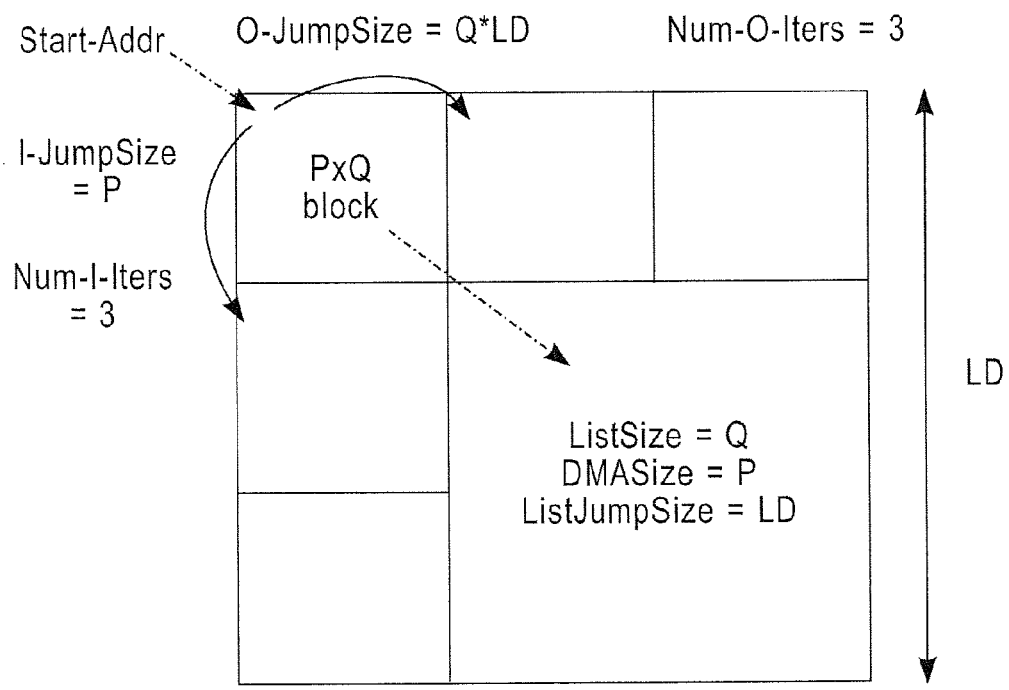
FIG. 2 illustrates an exemplary work-item that generates an access pattern for retrieving blocks of a matrix that is laid out in column-major format in column-order using two iteration loops, in accordance with one embodiment of the invention.

FIG. 2 illustrates an exemplary work-item that generates an access pattern for retrieving blocks of a matrix that is laid out in column-major format in column-order using two iteration loops. In this example, the matrix is divided into 9 blocks of size P×Q each, where P and Q are integers. These 9 blocks are arranged in a 3×3 grid. Therefore, in order to traverse the blocks of the matrix in column-order, three outer loops (Num-O-Iters=3) are required to traverse the three column-blocks and three inner loops (Num-I-Iters=3) to traverse the three blocks within each column-block. Moreover, as the matrix is stored in column-major order, the offset to jump from a current block to a next block within a column-block (inner-loop) is P (I-JumpSize=P). Similarly, the offset to jump when finished with a column-block (outer-loop) is Q*LD (O-JumpSize=Q*LD), where LD is the leading dimension of the matrix. To fetch each block requires Q DMA lists (ListSize=Q), each of P elements (DAMSize=P), and two consecutive columns of the block (List elements) are separated by an offset of LD (ListJumpSize=LD).

The parameters Operation frequency and Operation frequency initial offset may be used to schedule DMA operations when there are multiple work-items. One can view a running counter for the iteration number; the Operation frequency and Operation frequency initial offset parameters, along with Num-O-Iters and Num-I-Iters parameters, determine in which iterations a sub-test DMA operation will be performed.

As an illustrative example, consider a SGEMV routine, which is a BLAS level-2 (matrix-vector) routine that functions to multiply a matrix A (stored in row-major order) with a vector Y. An illustrative algorithm used in the SGEMV routine is shown below:

```
For i = 0 to m−1
    DMA get part of vector Y
    For j = 0 to n−1
        DMA get sub-block of Matrix A
        DMA get part of vector X
        Compute AX and add to Y
    Endfor
    DMA put part of vector Y
Endfor
```

In the above routine, m and n are integers, A is an m by n matrix, and X and Y are vectors.

The above SGEMV routine can be characterized by a template including four work-items as follows:

DMA GET for Y (frequency=n, initial offset=0)
DMA GET for A (frequency=1, initial offset=0)
DMA GET for X (frequency=1, initial offset=0)
COMPUTE (frequency=1, initial offset=0)
DMA PUT for Y (frequency=n, initial offset=n−1)

For operations that do not follow fixed patterns as described above (e.g., accessing lower-triangular blocks of a matrix), the benchmark run in block 104 of method 100 (see FIG. 1) can invoke a user-specified function that returns a value indicative of whether or not a prescribed operation is to be performed in a given iteration. This can be done, for example, by adding two parameters to the operations, namely, useFrequencyParameter and todoMethod, although alternative techniques are contemplated. If useFrequencyParameter is set to "true," then the frequency parameters are used, otherwise the user-function specified by the index in todoMethod is invoked to determine whether or not to perform the operation in the current iteration.

With reference again to FIG. 1, the output of benchmark generated in block 104 of the performance evaluation method 100 will be some measure of performance of the specified input template generated in block 102. This measure of performance can, in one embodiment, simply include the time taken to execute the benchmark. In an alternative embodiment, the measure of performance can be some derivative of execution time, such as, for example, computation rate in floating-point operations per second (flops).

By way of example only and without loss of generality, a reference implementation of the DMA-based evaluation benchmark routine that is executed on individual processing cores of a target processing system is shown below. This benchmark receives, as input, a template as described above consisting of n work-items characterizing a task to be evaluated. The benchmark outputs performance results, as stated above.

Benchmark Algorithm (reference implementation)

1. For every work-item (indexed by k), compute num_executions[k] to be the number of times this work-item will be executed. For DMA operations, this is num_executions[k] = Num-O-Iters[k] * Num-M-Iters[k] * Num-I-Iters[k]
2. Compute limit to be the maximum iteration in which any work-item will be executed. max_iterations = $\max_k$ (operationfrequency[k] * num_executions[k] + operation-frequency-initial-offset[k])
3. For each work-item (indexed by k),
    a. Initialize num_executed[k] = 0 (This keeps track of the number of times the work-item has been executed so far).
    b. Initialize count-O, count-M, count-I to 0 (These keep track of the current iteration number with respect to the outer, middle and inner loops).
4. Initialize Iteration_num to 0 (This keeps track of the current iteration number)
5. Start-Timer
6. While (Iteration_num < limit) do
    a. Scan Work-Items in order. For each work-item (indexed by k) (check type of work-item)
        i. If work-item corresponds to a GET operation
            Determine if the work-item is scheduled to be executed in this iteration
            if (iteration num = (num_executed[k] * operation-frequency[k] + operation-frequency-initial-offset[k])
                and (num executed[k] < num_executions[k]) then
            Compute the global address to perform DMA Get on
            Curr-addr = Start-Addr[k] + O-JumpSize[k] * Count-O[k] +
                    M-JumpSize[k] * Count-M[k] +
                    I-JumpSize[k] * Count-I[k]
            Invoke platform-specific function to perform DMA Get. The size of DMA transfer here is DMA-Size.
            Increment num_executed[k]
            Increment count-I[k]
            Check if done with an iteration of the middle-loop
            If (count-I[k] = num-I-Iters[k]) then
                Increment Count-M[k]
                Count-I[k] = 0
                Check If done with an iteration of the outer-loop
                If (count-M[k] = num-M-Iters[k]) then
                    Increment Count-O[k]
                    Count-M[k] = 0
        ii. If work-item corresponds to a PUT operation
            Same as GET except perform PUT DMA operation
        iii. If work-item corresponds to a GET LIST operation
            Same as GET except perform GET LIST DMA operation and use the parameters List-Size, DMA-Size, List-Jump-Size to form the DMA list
        iv. If work-item corresponds to a PUT LIST operation
            Same as GET LIST except perform PUT LIST DMA operation

| | Benchmark Algorithm (reference implementation) |
|---|---|
| v. | If work-item corresponds to a DMA WAIT operation |
| | Determine if the operation is to be performed in this iteration and invoke the platform specific implementation to wait for the corresponding DMA operation to complete. |
| vi. | If work-item corresponds to a COMPUTE operation |
| | Determine if the operation is to be perforemd in this iteration and invoke the user-supplied computation function (indexed by Kernel-Index). |
| 7. | End-Timer |
| 8. | Output Performance Result based on timers |

The above benchmark performs the computations and data-transfers of the algorithmic task and measures its performance. This is done, in accordance with an aspect of the invention, by generating data access patterns using DMA operations and invoking user-specified computation routines as specified by work-items/parameters constituting the input template and then timing the execution. This benchmark can be repeated for any number of different templates. In this manner, performance data can be collected and recorded for a given task for different values of specified parameters. Performance data can be stored in a database (108 in FIG. 1) or alternative storage means, as previously stated.

In one application of the invention, performance data collected in accordance with the performance evaluation method previously described herein can be utilized to determine optimal performance parameters with which to schedule a task at run-time. Additionally, the exemplary method described above (benchmark), can be used offline to populate the data that can serve as a performance model.

Figure 3:
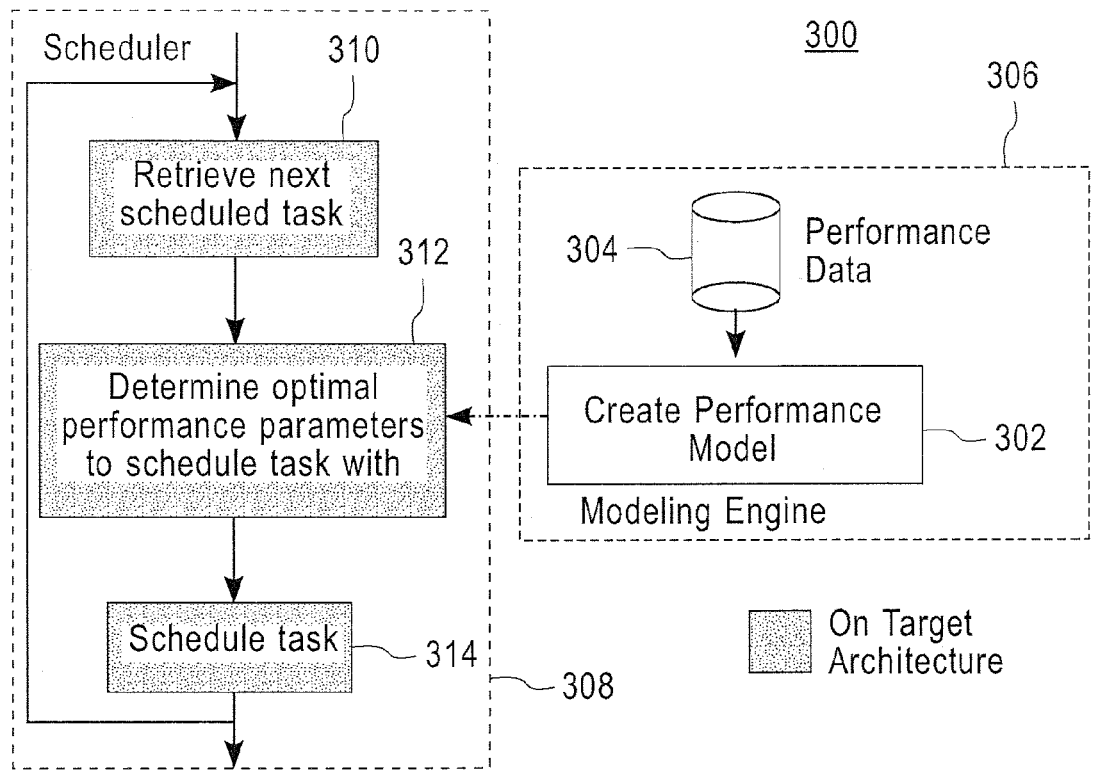
FIG. 3 illustrates an exemplary method for dynamically determining optimal performance parameters with which to schedule a task at run-time, in accordance with another embodiment of the invention.

FIG. 3 illustrates an exemplary method 300 for dynamically determining optimal performance parameters with which to schedule a task at run-time, in accordance with another embodiment of the invention. As apparent from the figure, a performance model is first created offline in block 302 using, as input, performance data which may be stored in a database 304. Database 304 may be the same as database 108 used to record output performance results for a given task generated in block 106 of the exemplary performance evaluation method 100 shown in FIG. 1. Alternatively, output performance results generated in block 106 may be supplied directly to block 302 for creating a performance model online, in substantially real time. The functionality of block 302 maybe implemented, for example, by an offline performance modeling engine 306, or alternative processor, operative to model the performance of a task based on the collected data.

The performance model generated in block 302 is then fed to a target architecture comprising an online scheduler 308, or an alternative processor. Scheduler 308 is preferably operative to schedule one or more processes running on a computing system in a multitasking environment. Scheduler 308 may be configured to implement a scheduling method on the target architecture which includes retrieving a scheduled task (block 310), determining optimal performance parameters with which to schedule the task (block 312) based at least in part on the performance model generated by the modeling engine 306 in block 302, and scheduling the task using the optimal performance parameters (block 314). The scheduling method may be repeated by proceeding back to block 310 for a next scheduled task. Based on the run-time parameters of the algorithmic task(s) to be performed at run-time, the scheduler 308 can use the performance model to dynamically determine a wide range of parameters with which to schedule the task. It is expected that the computational kernels running on the processing cores can perform their tasks intelligently based on these suggested parameters.

In one simple form, the performance model may comprise at least one multi-dimensional table and the optimal parameters for scheduling the tasks can be determined using one or more table lookups. To obviate the growth in the size of the lookup table and to permit generalization, more sophisticated techniques such as, for example, parametric and non-parametric estimation methods can be used to determine the parameters of interest, as will become apparent to those skilled in the art given the teachings herein.

It is to be understood that the run-time parameters of the algorithmic task are different from the dynamically determined parameters with which to schedule the task. As an example, for a BLAS call to multiply two matrices, the run-time parameters to the call are the sizes of the matrices to be multiplied. The dynamically determined parameters, on the other hand, are parameters like block sizes (the computation for multiplying two matrices of any given size can be accomplished by operating on sub-blocks of many different sizes; therefore the challenge here is to select the parameters for block size that are optimal for the matrix-multiplication specified by the user). Some illustrative dynamically determinable parameters of interest are described below by way of example only, although the invention is not limited to these specific parameters.

Determination of block/vector sizes for vector/matrix operations Mathematical libraries, particularly linear algebra libraries such as, for example, BLAS and LAPACK, typically perform operations on vectors and matrices in units of blocks (two-dimensional) or vectors (one-dimensional). From a performance perspective, it is important that the block/vector sizes are chosen appropriately with respect to the underlying architecture, taking into account, for example, number of available registers, cache size/hierarchy, etc. However, in the given multi-core processing setting, where the data is transferred using DMA, it becomes essential that the sizes be chosen appropriately with respect to the performance of the underlying DMA transfer operations as well. For instance, enough data should be fetched so that computation on the data can be accomplished during a period substantially equal to the latency of the next DMA (i.e., for the next data set to be available) when double buffering is employed.

Determination of Whether to Perform DMA List Operations vs. Contiguous DMA Operations For strided access (common in many mathematical routines—BLAS, FFT), when strides are not too large (depending on the target architecture, for instance on the Cell processor developed jointly by Sony, Toshiba and IBM, it may not be beneficial to construct lists for fetching data that is in the same cache line—less than 128 bytes apart), it may be more beneficial to use DMA in order to act upon the entire contiguous data and then operate on the required data elements instead of just retrieving the data portions that are required to be operated upon. This is due to the performance loss when using DMA lists. However, this comes at the expense of utilizing more storage space. Therefore, threshold values below which we should pull in the entire data and above which we can use DMA list operations can be dynamically determined as a parameter of interest.

Determination of Number of Processing Cores to Use

With multiple cores sending DMA requests simultaneously, there is a possibility of saturating the memory/interconnect bandwidth, particularly for bandwidth-bound applications such as BLAS level 1 and level 2 routines. After a certain threshold, the performance of an application may start degrading due to contention amongst the DMA requests. Therefore, it is important to ensure that an appropriate number of processing cores are put into service at any given time to handle the DMA requests.

Determining Whether to Spawn Jobs on Other Processing Cores

A processing core may spawn jobs (e.g., computations) on multiple cores. There are, however, certain costs associated with spawning these jobs, including added overhead associated with the distributed computing. Therefore, a core should only spawn a job on other cores when the computations are significant enough that the benefits of parallelizing the computations exceed the overhead of spawning the jobs. When such benefits are not exceeded, the processing core would perform the computations itself. In the given multi-core setting, where data transfer is done using DMA, latencies of fetching/storing data to operate on add to the overhead of spawning a job across multiple processing cores. This can impact the performance thresholds of the job. Therefore, the scheduler can determine whether or not to spawn jobs on other processing cores based at least in part on the thresholds obtained from the performance model.

DMA Performance-Based Architecture Refinement

A DMA-based performance evaluation benchmark in accordance with an embodiment of the invention can be used to evaluate hardware architectures and refine them using a simulator, or alternative hardware optimization tool. A set of templates that define prototypical DMA operations are run on the target architecture simulator. The results obtained from the simulator are provided (e.g., displayed) to the user. This provides a feedback mechanism for the user summarizing the DMA performance on the specified target architecture. The user then can iteratively refine the architectural parameters on the simulator and run the benchmark to evaluate the DMA performance on the target architecture. The user can generate templates specifying access patterns, operations of interest, etc., for which the target architecture is to be evaluated.

DMA-Performance Based Power Throttling

Power throttling, which is a mechanism for controlling power consumption in circuitry, can greatly impact performance of codes, especially traditional scientific codes that are computationally intensive. These codes cause continuous high stress on the computational units of the system that may trigger certain power throttling thresholds. More particularly, scientific codes often operate, at least in some phases of computation, at a high percentage of the computer system's theoretically achievable performance. This generally comes at the cost of increased power drain and heat production. Hence, it may be necessary to slow down the entire system, or at least certain components of the system, by reducing the clock frequency of the system and/or the power supplied to it.

When simple (e.g., frequency) throttling is employed, it is often the case that tripping a prescribed condition (e.g., demanding a certain amount of power or generating a certain amount of non-dissipated heat) will cause the entire system to slow down and not recover when the demand is lessened, at least not immediately. However, by using a system wherein the most power-hungry computational functional blocks are modeled in terms of their performance curves, particularly as they relate to DMA and/or other architectural entities, it is possible to shift the algorithm so that these power thresholds are avoided and the overall code will yield a better time to solution even if some codes have to be throttled back. Further, if finer-grained power throttling is employed, such a system would allow power to be pre-shunted to or from those portions of the system with higher power demand on a similarly fine-grained basis, assuming that such an interface is available from application or system space.

Exemplary System and Article of Manufacture Details

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 4:
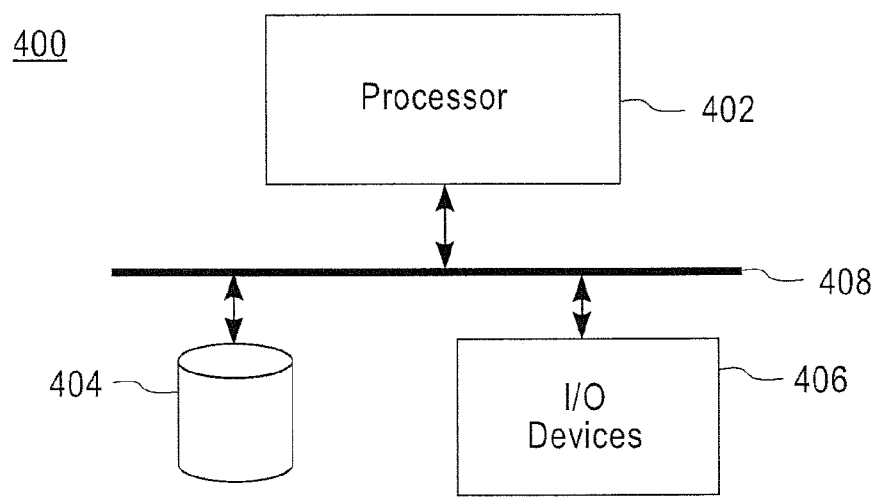
FIG. 4 is a block diagram illustrating at least a portion of an exemplary processing system in which techniques of the present can be implemented.

One or more embodiments can make use of software running on a general purpose computer or workstation. With reference to FIG. 4, such an implementation might employ, for example, a processor 402, a memory 404, and an input/output (I/O) interface 406 formed by I/O devices including, for example, by a display (for presenting results of the processor) and a keyboard (for entering data to the processor). The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer).

The processor 402, memory 404, and I/O interface 406 can be interconnected, for example, via bus 408 as part of a data processing unit. Suitable interconnections, for example via bus 408, can also be provided to a network interface (not explicitly shown), such as a network card, which can be provided to interface with a computer network, and to a media interface (not explicitly shown), such as a diskette or CD-ROM drive, which can be provided to the I/O interface with media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example memory 404), magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 402 coupled directly or indirectly to memory elements 404 through a system bus 408. The memory elements can include local memory employed during actual execution of the program code, bulk storage, and cache memories which provide temporary storage of at least some program code in order to reduce the number of times code must be retrieved from bulk storage during execution.

I/O devices (including but not limited to keyboards, displays, pointing devices, and the like) can be coupled to the system either directly (such as via bus 408) or through intervening I/O controllers (omitted for clarity). Network adapters such as network interface may also be coupled to the system to enable the data processing system to become coupled to other data processing systems or remote printers or storage devices through intervening private or public networks. Modems, cable modems and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. Apparatus for evaluating performance of direct memory access (DMA)-based algorithmic tasks on a target multi-core processing system, the apparatus comprising:
    a memory; and
    at least one processor coupled to the memory and operative: to input a template for a specified task, the template including DMA-related parameters specifying DMA operations and computational operations to be performed; to evaluate performance for the specified task by running a benchmark on the target multi-core processing system, the benchmark being operative to generate data access patterns using DMA operations and invoking prescribed computation routines as specified by the template; and to provide results of the benchmark indicative of a measure of performance of the specified task corresponding to the target multi-core processing system.

2. Apparatus for dynamically determining optimal performance parameters with which to schedule tasks at run-time on a target multi-core processing system, the apparatus comprising:
    a memory; and
    at least one processor coupled to the memory and operative: to create a performance model offline using, as input, performance data corresponding to a task, the performance model representing an evaluation of performance of direct memory access (DMA)-based algorithmic tasks on the target multi-core processing system; to retrieve a task to be scheduled; to determine optimal performance parameters with which to schedule the task based at least in part on the performance model; and to schedule the task using the optimal performance parameters;
    wherein retrieving the task, determining the optimal performance parameters and scheduling the task are performed on the target multi-core processing system.

3. A computer program product comprising a computer useable medium including computer usable program code for evaluating performance of direct memory access (DMA)-based algorithmic tasks on a target multi-core processing system, said computer program product including:
    computer usable program code for inputting a template for a specified task, the template including DMA-related parameters specifying DMA operations and computational operations to be performed;
    computer usable program code for evaluating performance for the specified task by running a benchmark on the target multi-core processing system, the benchmark being operative to generate data access patterns using DMA operations and invoking prescribed computation routines as specified by the template; and
    computer usable program code for providing results of the benchmark indicative of a measure of performance of the specified task corresponding to the target multi-core processing system.

4. A computer program product comprising a computer useable medium including computer usable program code for dynamically determining optimal performance parameters with which to schedule tasks at run-time on a target multi-core processing system, said computer program product including:
    computer usable program code for creating a performance model offline using, as input, performance data corresponding to a task, the performance model representing an evaluation of performance of direct memory access (DMA)-based algorithmic tasks on the target multi-core processing system;
    computer usable program code for retrieving a task to be scheduled;
    computer usable program code for determining optimal performance parameters with which to schedule the task based at least in part on the performance model; and
    computer usable program code for scheduling the task using the optimal performance parameters;
    wherein retrieving the task, determining the optimal performance parameters and scheduling the task are performed on the target multi-core processing system.

* * * * *